United States Patent [19]

Hayward et al.

[11] 4,049,832
[45] Sept. 20, 1977

[54] HIGH FAT, FORTIFIED, MARSHMALLOW BASED FOOD BAR

[75] Inventors: James R. Hayward, McHenry; William L. Keyser, East Dundee; Walter J. Zielinski, Ingleside, all of Ill.

[73] Assignee: The Quaker Oats Company, Chicago, Ill.

[21] Appl. No.: 710,451

[22] Filed: Aug. 2, 1976

[51] Int. Cl.² .............................................. A23G 3/00
[52] U.S. Cl. .......................................... 426/72; 426/99; 426/133; 426/532; 426/571; 426/656; 426/418
[58] Field of Search ................... 426/72, 99, 571, 532, 426/810, 418, 656, 103, 660, 573, 133

[56] References Cited

U.S. PATENT DOCUMENTS

| | | | |
|---|---|---|---|
| 3,556,812 | 1/1971 | Krohn | 426/572 |
| 3,607,309 | 9/1971 | Olney | 426/571 |
| 3,684,528 | 8/1972 | Batey | 426/571 |
| 3,793,464 | 2/1974 | Rusch | 426/99 |
| 3,860,733 | 1/1975 | Morse | 424/302 |

*Primary Examiner*—Jeanette M. Hunter
*Attorney, Agent, or Firm*—Charles J. Hunter

[57] ABSTRACT

A food bar is produced having a marshmallow base low in reducing sugars and with the marshmallow base having therein up to 10 percent by weight emulsified fat, said fat containing up to 20 percent by weight emulsifier, and, in addition, having therein from 1–20 percent by weight protein of reduced water binding capability.

11 Claims, No Drawings

HIGH FAT, FORTIFIED, MARSHMALLOW BASED FOOD BAR

BACKGROUND OF THE INVENTION

1. FIELD OF THE INVENTION

This invention relates to a food bar bound by marshmallow having emulsified fat therein.

2. DESCRIPTION OF THE PRIOR ART

The basic process for the production of marshmallow as it is known today was first shown in U.S. Pat. No. 2,600,569 to E. T. Oakes in 1952. This invention was the first showing of the injection of gas into a marshmallow mix to cause it to puff upon release of gas pressure. Since that time, many patents have issued showing different additions to marshmallows to provide different flavoring or other features. While U.S. Pat No. 3,684,528 showed the inclusion of non-fat milk solids into a marshmallow, it showed the mixing thereof with other materials such as salt, sugar, and vanilla concentrate.

The inclusion of fats in marshmallows is not a new or novel idea. U.S. Pat. No. 3,556,012 discusses thoroughly the inclusion of fats in marshmallows with the fats in this case being cocoa butter fat. The inclusion of emulsified fats in marshmallows is also not new. Numerous teachings have shown the inclusion in marshmallow of small amounts of emulsified fats. It has not been shown, however, that emulsified fats can be added to marshmallow along with addition of other fatty materials. The reason for this is that a marshmallow is a water emulsion which is readily broken by inclusion therein of significant amounts of fat. If fats are added in two or three different major ingredients, then the whipping properties of the marshmallow are totally destroyed and a marshmallow product is thereby not produced.

It has not heretofore been shown that protein of reduced water binding capability has been added to high fat containing marshmallow made from non-reducing sugars. While it may well be that the prior art includes the introduction of fats into marshmallows along with other proteins such as casein, there has been no showing of: first, a protein of reduced water binding capability being included independently of the fat therein; and, second, the inclusion of significant amounts of emulsified fats therein.

In the present invention, two independent fat or fat-containing materials may be included in the marshmallow. First, rather substantial amounts of emulsified fats are included in the marshmallow. Fat coated protein, i.e. fat coated casein, coated independently of the emulsified fat, is also included within the marshmallow. There has not been any showing, in prior marshmallow production, of the inclusion of such ingredients in this combination within a marshmallow product.

SUMMARY OF THE INVENTION

It is an object of this invention to provide a marshmallow for use in food bars which is fortified with protein.

It is another object of this invention to provide a fortified marshmallow product which has included therein substantial amounts of fat.

It is an additional object of this invention to provide a marshmallow system which is stable against degradation of the fortified ingredients therein.

It is a further object of this invention to provide a new and novel process for producing a marshmallow base for use in food bars.

The objects of this invention are accomplished by marshmallow low in reducing sugars and having therein up to 10 percent by weight emulsified fat containing up to 20 percent by weight emulsifier and in addition having therein from 1 percent to 20 percent by weight protein having reduced water binding capability.

The marshmallow based product discussed above preferably may include therein fat coated protein, which includes casein or caseinate salts, which has been coated independently of the emulsified fat. It may also include heat treated protein. The product also preferably includes fat coated vitamins coated independently of the emulsified fat. The term "emulsified fat" as used herein is intended to mean a fat which contains emulsifiers.

The objects of this invention are further accomplished by a process for producing a high fat, fortified, marshmallow, said process comprising:

a. preparing a marshmallow mix low in reducing sugars and containing up to 10 percent by weight emulsified fat containing up to 20 percent by weight emulsifier;

b. mixing air with the marshmallow mix until the atmospheric pressure density thereof is from about 30–74 oz. per gallon;

c. reducing any pressure on the air-marshmallow mix until the pressure is substantially atmospheric pressure;

d. including in the mix from 1–20 percent by weight protein material having a protein content greater than 30 percent by weight, said protein material having a reduced water binding capability; and e. allowing the mixture to set.

Preferably, the above process includes in the marshmallow mix fat coated vitamins which have been fat coated prior to inclusion in the mix. Preferably, after production of the product, it is inserted into a container along with a water converting catalyst, the atmosphere is then displaced with a hydrogen containing atmosphere containing not more than about 4 percent by weight oxygen and then the container is sealed to prevent further oxygen from reaching the material.

The objects of this invention are further accomplished by the combination comprising a marshmallow low in reducing sugars and containing up to 10 percent by weight emulsified fat having up to 20 percent by weight emulsifier therein and also having therein from 1–20 percent by weight protein, of reduced water binding capability, and further including therein fat coated vitamins, fat coated independently of the emulsified fat, said marshmallow having a water activity coefficient, $A_w$, of not more than 0.85; a hermetically sealed container completely encircling the marshmallow; a water converting catalyst within the confines of the container; and an atmosphere surrounding the food product in the container, said atmosphere comprising no more than about 4 percent by weight oxygen and the remainder of the atmosphere comprising an inert gas and sufficient hydrogen to combine with all of the oxygen and convert it to water.

Marshmallow is an aerated food product usually composed of various saccharides, water, gelatin and flavoring agents. Although optional, marshmallow may also contain edible coloring and other minor edible ingredients such as edible humectants.

Marshmallow syrup is the mixture of ingredients that is aerated and whipped to form marshmallow. By use herein of the terms "marshmallow mix" and "marshmallow syrup" we intend to refer to a marshmallow syrup. Depending on the method for marshmallow production, marshmallow syrup usually has a moisture content of about 16–30 percent by weight, very little of which is lost in processing. A more detailed description of marshmallow syrup is found later on in this discussion.

Marshmallow syrup generally has a density of approximately 127 oz. per gallon. In the production of marshmallow, marshmallow syrup is whipped and intermixed with an inert, edible gas such as air or nitrogen until the density of the mixture is approximately 44 oz. per gallon. This volumetric expansion, i.e. volume increase of 2–3 times, gives marshmallow the characteristic spongy texture which consumers desire. In fact, these spongy and low-density texture characteristics are so common to marshmallow that consumers will not accept a product lacking in them.

Many different flavoring agents have been utilized to alter the taste of marshmallow. These flavoring agents have heretofore been required to have low fat contents and be used in such small quantities that the final marshmallow product has a very low fat content, i.e. usually below 1.0 percent by weight fat. This low fat content has been required in order to prevent excess fat from precluding expansion during whipping and aeration. Since the marshmallow whip is essentially a mixture of ingredients mixed with and whipped with water, very small quantities, i.e. above 1 percent by weight, of fats or oils have heretofore broken this whip preventing the required product expansion. This is obvious since oils or fats and water do not readily mix and thus would not be thought to be a combination which could be whipped. While some attempts have been made to increase the oil or fat level in marshmallow, these attempts have generally been through the addition of certain additives which prevent the oil from breaking the emulsion or whip. While these attempts have met minor success in providing incremental increases in fat content, the additional additives have created an off-taste or foreign taste which has made the marshmallow product unacceptable.

A marshmallow mix for use in production herein includes various ingredients which as described above include various non-reducing saccharides, water, gelatin, and flavoring agents. By use of the term "gelatin" we intend to mean a gelatinous material obtained from animal tissues by prolonged boiling or any of the various substances resembling gelatin in physical properties. Gelatin is sold on the basis of bloom test or jelly test and gelatin having a bloom test or jelly test of from 150–300 grams is normally considered acceptable for marshmallow production. It is usually preferred, however, to use from 1.5 to 2.5 percent by weight of a gelatin having a bloom test of from 225–250 grams with variations in bloom test values being compensated for by using less gelatin as the bloom test value increases.

By use herein of the term "marshmallow mix" it is intended to mean those mixed ingredients which are whipped and aerated to produce marshmallow. These include the marshmallow syrups known in the industry, and include by reference the description found in the Krohn and Polito patent, U.S. Pat. No. 3,556,812, modified to provide a minimum, i.e. below 5 percent by weight, of reducing sugars.

When the process of this invention calls for the mixing of air with the marshmallow mix until density at atmospheric pressure is from about 30–74 oz. per gallon, it is intended to mean those processes in which air can be injected or whipped into the marshmallow mix to give it the requisite density. For instance, the Oakes type gas injection system, as previously referred to, is perfectly acceptable. Additionally, the whipping of air by a simple wire mixer can be sufficient so long as sufficient air is included in the product to insure the requisite density. Additionally, other new types of marshmallow equipment, well known in the industry, are now capable of inserting or injecting sufficient amounts of air into the marshmallow while mixing it to provide at atmospheric pressure the requisite density. If the mixing is not at atmospheric pressure, then prior to the casting or setting thereof, the pressure must be reduced until it is approximately atmospheric.

Marshmallow mixes that may be used in this invention are the normal marshmallow mixes well known in the industry. Ingredients used in marshmallow production, as well as the amounts thereof, are well known in the marshmallow industry. Among the many formulas that are acceptable for marshmallow production are those found in the following: *Candy Making As A Science And Art*, by Claude D. Barnette, Don Guessel Publications, Inc., N.Y., 1960, pp. 99–103; *An Encyclopedia of Candy and Ice Cream Making*, by Simon I. Leon, Chemical Publishing Co., N.Y., 1959, pp. 294–304; and *A Textbook on Candy Making*, by Alfred E. Leighton, Manufacturing Confectioners Publishing Co., Oak Park, Ill., 1952, pp. 55–68. A typical formula for use herein would include about 60–85 percent by weight sucrose, about 15–25 percent by weight water; about 2–5 by weight invert sugar; and about 1–4 percent by weight gelatin. The typical formula may also include some alterations of the formula such as replacing part or all of the reducing sugars and syrups with non-reducing sugars and syrups. Various flavoring agents and humectants may also be added in minor amounts. Preferably in this invention, the marshmallow mix has about 80.1 percent by weight sucrose, about 18.3 percent by weight water, about 1.2 percent by weight gelatin, and about 0.4 percent other ingredients such as flavoring, coloring and preservatives.

It must be understood that the marshmallow of this invention must have below about 5 percent by weight reducing sugars therein or else the effect on the protein will make the product undesirable. It is preferred to have less than 2 percent by weight reducing sugars in the marshmallow.

The density of the marshmallow produced by this invention must be from 30–74 oz. per gallon at atmospheric pressure, and sufficient air must be inserted therein to produce this requisite density effect. When referring to density of the product it is intended to refer to the density at atmospheric pressure, i.e. gas pressure removed unless it is otherwise stated.

In the marshmallow of this invention, it is preferable to include therein a fatty material which has been emulsified. Up to 10 percent, by weight of the marshmallow, of emulsified fat is included in the product. The emulsified fat containing up to 20 percent by weight emulsifier. Prior to inclusion in the marshmallow, the fatty product is emulsified with an emulsifier which has an HLB ratio of from about 5 to 8. Of particular use as emulsifiers in this invention are polyglycerol esters mixed with fatty acids and lecithin and having a free fatty acid content of 0.5 percent and an HLB of 7–7.2.

The high protein ingredient can be one of two types: it can be a fat coated protein such as casein or caseinate salt; or it can be a protein which has been heat treated to substantially reduce the water binding capability thereof.

When fat coated protein is used, the protein is coated with a vegetable oil or fat having a melting point below 120° F. The coating must be applied prior to inclusion of the protein in the product and cannot simply be mixed with a fat containing mixture to produce an acceptable product.

When a heat treated protein is used, a protein containing material is heated to denature the protein therein and gelatinize the remaining starch therein until the protein ingredient is substantially incapable of binding water. Of course, the heating cannot be so severe that it destroys the protein efficiency ratio substantially. It has been found that a heating of 350° F. for ½ to 1½ minutes accomplishes this but other such times and temperatures that produce an equivalent result are acceptable and with one skilled in the art of heat treating protein materials.

In the process of this invention, the marshmallow mix is first produced having therein the requisite amount of emulsified fat and the requisite amount of modified protein. This is done by simply adding the emulsified fat with the marshmallow mix. If fat coated vitamins are preferred in the product, then these are also added at that time in the mix. In the case of addition of a fat, it is preferable to use a vegetable oil or fat, both as the addition to the marshmallow mix and as a coating for the other products. The marshmallow is then mixed with air until the product has the requisite density. If any pressure is on the product then, it must be reduced until it is atmospheric pressure at which time the mixture is allowed to set. In coating the casein or caseinate salts, the casein protein material must be added with the fat and mixed until its water binding capability is substantially reduced. In using cereal protein it is generally preferred to heat it to 350° F. for 1 minute. After the protein has been rendered substantially incapable of binding water, it is then inserted into the marshmallow mix after the mix has been aerated. The marshmallow is then allowed to set.

It is preferred preferred to include fat coated vitamins along with the fat and treated protein. Again, the mixture of vitamins must be fat coated prior to inclusion in the product and, as in the case of casein, neither of the products can be simply mixed with the fat that is included in the marshmallow mix to accomplish this desired goal. Of course, the preferable inclusion of vitamins in the mixture is one which vitamin C is the utilized vitamin. While it must be understood that the process of this invention produces a protein and/or vitamin fortified marshmallow product which can be used to bind other cereal ingredients to provide an excellent food product, the marshmallow based product also has microbiological stability and the product can be further enhanced by including it within a system of packaging which prevents deterioration of the fortification over long periods of time. In such a case, the marshmallow is produced having the requisite inclusion of materials therein, and having the requisite density, and then after being set, the marshmallow is inserted into a container along with a water converting catalyst followed by displacing the atmosphere in the container with a hydrogen containing atmosphere containing not more than about 4 percent by weight oxygen followed by sealing of the container to prevent further oxygen from reaching the material.

In the process, the marshmallow is inserted into a container along with a water converting catalyst. The water converting catalyst can be any of the known catalysts that are inert with respect to the product and which are also non-toxic when included into a food package. It has been found for instance that it is highly desirable to use a noble metal catalyst, including such things as palladium and platinum catalysts, which are well known to convert a mixture of oxygen and hydrogen to water. By use herein then of the term "water converting catalyst" it is intended to mean any catalyst which is inert with respect to the product and which converts a mixture of hydrogen and oxygen to water. Preferable use of the water converting catalyst includes those embodiments in which the catalyst is simply attached to the side wall of the container or where the catalyst is sandwiched between strips of air permeable materials.

After the product is inserted into the container with the water converting catalyst, the atmosphere thereon must be displaced with a hydrogen containing atmosphere containing not more than about 4 percent by weight oxygen. In this case, the hydrogen containing atmosphere must be an inert gas, inert with respect to the product, non-toxic and having sufficient hydrogen to combine with the oxygen, and preferably within excess so that there is insurance that all the oxygen is converted. Nitrogen has been found to be a highly acceptable inert atmosphere for inclusion with the hydrogen. The displacing of the atmosphere with the inert gas and hydrogen can be a displacement using a flushing system which flushes completely the surrounding atmosphere in the container or may be a double flushing system, or a combination as long as the end goal of removal of all or substantially all of the oxygen is accomplished, or at least until a maximum of about 4 percent by weight oxygen is achieved. Thereafter, the container is sealed to prevent further oxygen from reaching the product. At such time, gradually over the containing of the product, the catalyst converts the oxygen and hydrogen to water, and the produced water is absorbed by the product or else remains in the container. The amount of produced water is so small that it does not have a harmful effect on the product. The moisture is then absorbed into the product and stabilized by materials in the product. In such a case, no oxygen is remaining in the free state for a combination with the protein or vitamins to render them ineffective or degrade them. Additionally, the benefits of the product are such that it does not degrade due to oxygenation of any of the material or ingredients within the marshmallow, and additionally, the sealing of the container prevents the marshmallow product from losing its moisture and becoming hard.

It is preferred in the process of this invention to include in the marshmallow a fat coated vitamin, coated with a fatty material comprising a saturated aliphatic acid having between 12 and 20 carbon atoms inclusive or a glyceride having the formula:

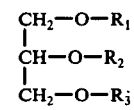

whereby $R_1$ is an acyl radical derived from a saturated aliphatic acid having between 12 and 20 carbon atoms per molecule and $R_2$ and $R_3$ are hydrogen or the same as $R_1$. The fatty material must have a melting point of from 100° to 200° F. The preferable process for producing the coated vitamin is one in which the fatty material is admixed with a mixture of vitamins, and added thereto is a liquid or solid cooling agent such as liquid nitrogen or liquid or solid carbon dioxide. The cooling agent is admixed in amounts sufficient to solidify the mixture and maintain the mixture solidified throughout the coating process. The cooling agent must be non-toxic and chemically inert with respect to the vitamins and the fatty material. After the mixture of cooling agent and fatty material and vitamins is completed to the solidification of the fatty material, the mixture is then subdivided until a major portion thereof passes through a number 20 U.S. Sieve that has a particle size above about 75 microns in diameter. After this size distribution is achieved, the cooling material is then allowed to remove itself therefrom by sublimation or evaporation. One of the more important vitamins for use in the above process is vitamin C.

DESCRIPTION OF THE PREFERRED EMBODIMENTS

This invention may be more fully described but is not limited by the following examples:

EXAMPLE 1

A marshmallow mix is prepared. For the mixture 0.927 parts by weight gelatin (Bloom Test Strength 250 grams) is added to a first jacketed kettle containing 8.2 parts by weight water. The gelatin is allowed to soak in the water for about 5 minutes and then steam is introduced into the jacketed kettle until the temperature of the mixture is 145° F. While maintaining the mixture at 145° F. the mixture is stirred until all the gelatin is dissolved in the water. The mixture is then set aside for inclusion in the product. The mixture is referred to as the gelatin mix.

The marshmallow premix is prepared in a second jacketed kettle. For the marshmallow premix 8.3 parts by weight water, 0.067 parts by weight preservatives, 17.2 parts by weight sugar, 0.046 parts by weight flavoring (vanilla) and 0.21 parts by weight color added to the jacketed kettle. These ingredients are then stirred until completely mixed. The marshmallow mixture or marshmallow syrup is then prepared by adding the gelatin mix prepared in the first jacketed kettle to the marshmallow mix in the second jacketed kettle. These ingredients are then thoroughly mixed until a mixture is uniform throughout with regard to each of the ingredients. Fat emulsified with a mixture of polyglycerol esters, fatty acids, and lecithin having an HLB of 7.0-7.2 and a free fatty acid content of 0.5 percent is then mixed within the marshmallow mix. The ingredients are circulated through a heat exchanger and the ingredients are are circulated through a heat exchanger and the temperature reduced to about 75° F. and maintained constant at that temperature. The mixture is then introduced as a continuous stream into an Oakes continuous marshmallow mixer and beater (The E. T. Oakes Corporation, Islip, N.Y.). The mixture is adjusted so that the aerated marshmallow mixture leaving the mixer is at a temperature of 85° +3° F. The air is injected into the mixture and the flow rate and pressure of the air are adjusted until samples of the product exposed to atmospheric pressure have a density of about 45-55 oz. per gallon. Pressure of the aerated mixture leaving the mixer is found to fluctuate within the range of about 40-60 psig. The mixture is then introduced into the atmosphere whereupon it expands and has the density of about 50 oz. per gallon. One part by weight casein is coated with vegetable oil until it cannot substantially bind water. It is then added to the expanded mix. The mixture is then allowed to set. The uniformly blended mixture has a moisture content of about 28 percent by weight, a density of about 111-119 oz. per gallon, a sweet marshmallow flavor, a firm moist spongy characteristic marshmallow texture, excellent fortification and quality color.

EXAMPLE 2

Example 1 is repeated with the exception that a vitamin mix is included in the marshmallow mix. The vitamin mix is prepared by adding vitamin C to a vegetable shortening having a melting point of greater than 110° F. (preferably 142° F.) and then mixing this with carbon dioxide in an amount of about 4 times by weight of the vitamin C and vegetable fat. This mixture is then thoroughly mixed and placed through a screen to give a particle size distribution such that it will pass through a screen to give a particle size distribution such that it will pass through a No. 20 U.S. Sieve but has a particle size of about 100 microns. The dry ice is then allowed to sublime off of the mix to give a fat coated vitamin C. About ½ parts by weight of this vitamin mixture is then mixed into the marshmallow mix and the marshmallow process of Example 1 is continued and produces a quality product of good taste. The vitamin taste normally characteristic of vitamins is not found in the excellent product thus produced.

EXAMPLE 3

Example 1 is repeated with the exception that the protein therein is soy protein isolate which has been heated to 350° F. for one minute rather than casein. Again, an excellent product is produced.

EXAMPLE 4

Example 2 is repeated with the exception that the protein, rather than being casein, is soy protein concentrate which has been heated to 350° F. for 1 minute. Again, an excellent fortified product is produced.

EXAMPLE 5

Example 1 is repeated with the addition that the product produced is then placed in a bag along with a palladium catalyst. The palladium catalyst is sandwiched between two layers of polyethylene which are permeable to the air or atmosphere sufficient to allow it to pass therethrough. The bag is then flushed with a mixture containing 8 parts by weight hydrogen and 92 parts by weight nitrogen. After a double flushing with this gas, the product is then sealed in the bag to prevent further oxygen from entering the bag. After a period of time, the product is found to have high quality and good taste, and the protein added thereto is found to be very stable.

EXAMPLE 6

Example 2 is repeated with the conditions defined in Example 3. Again, an excellent product is produced.

EXAMPLE 7

Example 3 is repeated with the conditions defined in Example 5. Again, an excellent product is produced.

EXAMPLE 8

Example 4 is repeated with the conditions defined in Example 5. Again, an excellent product is produced.

It may thus be seen that this invention provides a new and novel marshmallow product which is highly desirable in that it contains fat for energy and fat coated fortified proteinaceous materials which have heretofore not been shown. Heretofore, it has been unknown to include major amounts of fat within a marshmallow product and still be able to include therein major amounts of protein. Additionally, this product produces a vitamin fortified product having all the advantages of other fortification. In addition to the excellent fortification of this product, the fortification ingredients are maintained with their integredity throughout the process and provide a consistently high quality product. Heretofore, it has been unknown to produce a fortified marshmallow product which remains stable for long periods of time as has been shown here.

Having fully described this new and unique invention, the following is claimed:

1. Marshmallow low in reducing sugars and having therein up to 10 percent by weight emulsified fat, and from 1-20 percent by weight protein of reduced water binding capability; said emulsified fat containing up to 20 percent by weight emulsifier; said protein of reduced water binding capability being selected from the group consisting of heat treated protein, fat coated protein, and combinations thereof; said reducing sugars being below about 5 percent by weight.

2. Marshmallow as in claim 1 wherein the protein is fat coated casein or caseinate salts coated independently of the emulsified fat.

3. Marshmallow as in claim 1 having therein fat coated vitamins coated independently of the emulsified fat.

4. Marshmallow as in claim 2 having therein fat coated vitamins coated independently of the emulsified fat.

5. A process for producing a high fat, fortified marshmallow, said process comprising:
   a. preparing a marshmallow mix low in reducing sugars and containing up to 10 percent by weight emulsified fat, said fat containing up to 20 percent by weight emulsifier;
   b. mixing air with the marshmallow mix until the atmospheric pressure density thereof is from about 30–74 oz. per gallon;
   c. reducing any pressure on the air-marshmallow mix until the pressure is substantially atmospheric pressure;
   d. including in the mix from 1-20 percent by weight protein material having a protein content greater than 30 percent by weight, said protein material having a reduced water binding capability and being selected from the group consisting of heat treated protein, fat coated protein and combinations thereof; and
   e. allowing the mixture to set.

6. A process as in claim 5 also including in the marshmallow mix fat coated vitamins which have been fat coated prior to inclusion in the mix.

7. A process as in claim 6 further including: inserting the set marshmallow into a container along with a water converting catalyst; displacing the atmosphere in the container with a hydrogen containing atmosphere containing not more than about 4 percent by weight oxygen; and sealing the container to prevent further oxygen from reaching the material.

8. In combination: a marshmallow low in reducing sugars, containing up to 10 percent by weight emulsified fat, said emulsified fat having up to 20 percent by weight emulsifier therein, said marshmallow also containing from 1-20 percent by weight protein having reduced water binding capability selected from the group consisting of heat treated protein, fat coated protein and combinations thereof and said marshmallow further containing fat coated vitamins fat coated independently of the emulsified fat, said marshmallow having a water activity coefficient, $A_w$, of not more than 0.85, said reducing sugars being below about 5 percent by weight; a hermetically sealed container completely encircling the marshmallow; a water converting catalyst within the confines of the container; and an atmospheric surrounding the food product in the container; said atmosphere comprising no more than about 4 percent by weight oxygen and the remainder of the atmosphere comprising an inert gas and sufficient hydrogen to combine with all of the oxygen and convert it to water.

9. A process for producing a high fat, fortified marshmallow, said process comprising:
   a. preparing a marshmallow mix low in reducing sugars and containing up to 10 percent by weight emulsified fat, said fat containing up to 20 percent by weight emulsifier, said reducing sugars being present in an amount less than 5 percent by weight of the final marshmallow;
   b. mixing air with the marshmallow mix until the atmospheric pressure density thereof is from about 30–74 oz. per gallon;
   c. reducing any pressure on the air-marshmallow mix until the pressure is substantially atmospheric pressure;
   d. including in the mix from 1-20 percent by weight protein material having a protein content greater than 30 percent by weight, said protein material having a reduced water binding capability and being selected from the group consisting of heat treated protein, fat coated protein and combinations thereof;
   e. allowing the mixture to set;
   f. inserting the set marshmallow into a container along with a water converting catalyst;
   g. displacing the atmosphere in the container with a hydrogen containing atmosphere containing not more than about 4 percent by weight oxygen; and
   h. sealing the container to prevent further oxygen from reaching the material.

10. A process as in claim 9 also including in the marshmallow mix fat coated vitamins which have been fat coated prior to inclusion in the mix.

11. Marshmallow low in reducing sugars and having therein up to 10 percent by weight emulsified fat, from 1-20 percent by weight protein of reduced water binding capability, and fat coated vitamins coated independently of the emulsified fat; said emulsified fat containing up to 20 percent by weight emulsifier; said protein of reduced water binding capability being selected from the group consisting of heat treated protein, fat coated protein, and combinations thereof.

* * * * *